(12) United States Patent
Huang et al.

(10) Patent No.: US 7,782,952 B2
(45) Date of Patent: Aug. 24, 2010

(54) APPARATUS AND METHOD FOR MOTION ESTIMATION SUPPORTING MULTIPLE VIDEO COMPRESSION STANDARDS

(75) Inventors: Chao-Tsung Huang, Kaohsiung (TW); Po-Chih Tseng, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1289 days.

(21) Appl. No.: 11/164,926

(22) Filed: Dec. 12, 2005

(65) Prior Publication Data

US 2007/0092010 A1    Apr. 26, 2007

(30) Foreign Application Priority Data

Oct. 25, 2005    (TW) .............................. 94137241 A

(51) Int. Cl.
*H04N 7/34*    (2006.01)
*H04N 7/50*    (2006.01)

(52) U.S. Cl. .............................. 375/240.16; 375/240.17; 375/240.24; 375/240.29

(58) Field of Classification Search ............ 375/240.16, 375/240.17, 240.12, 240.14, 240.15, 240.24, 375/240.29
See application file for complete search history.

(56) References Cited

U.S. PATENT DOCUMENTS

| | | | | |
|---|---|---|---|---|
| 5,920,353 A | 7/1999 | Diaz et al. | ................. | 348/402 |
| 2007/0019738 A1* | 1/2007 | Huang | .................. | 375/240.17 |
| 2007/0092003 A1* | 4/2007 | Huang | .................. | 375/240.12 |
| 2008/0181308 A1* | 7/2008 | Wang et al. | ............. | 375/240.16 |
| 2008/0253457 A1* | 10/2008 | Moore | .................. | 375/240.16 |
| 2010/0020881 A1* | 1/2010 | Kotaka et al. | .......... | 375/240.17 |

FOREIGN PATENT DOCUMENTS

| | | |
|---|---|---|
| JP | 2004-241957 | 8/2004 |
| JP | 2005-079621 | 3/2005 |
| JP | 2005-136941 | 5/2005 |
| JP | 2005-167852 | 6/2005 |
| JP | 2005-268879 | 9/2005 |

OTHER PUBLICATIONS

"Final Office Action of Japan counterpart application", issued on Jul. 15, 2009, p. 1-p. 2.

* cited by examiner

*Primary Examiner*—Scott A Rogers
(74) *Attorney, Agent, or Firm*—Jianq Chyun IP Office

(57) ABSTRACT

An apparatus for motion estimation which supports multiple video compression standards and the method thereof is provided. The apparatus uses an interpolation filter with fixed coefficients. The apparatus also adjusts block sizes and calculation details of cost functions according to various video compression standards. Therefore the apparatus is capable of supporting multiple standards and providing high-quality video compression.

17 Claims, 1 Drawing Sheet

APPARATUS AND METHOD FOR MOTION ESTIMATION SUPPORTING MULTIPLE VIDEO COMPRESSION STANDARDS

CROSS-REFERENCE TO RELATED APPLICATION

This application claims the priority benefit of Taiwan application Ser. No. 94137241, filed on Oct. 25, 2005. All disclosure of the Taiwan application is incorporated herein by reference.

BACKGROUND OF THE INVENTION

1. Field of Invention

The present invention relates to apparatus and method for motion estimation, used in video compression. More particularly, the present invention relates to apparatus and method for motion estimation, which is supporting multiple video compression standards.

2. Description of Related Art

Generally, the motion estimation is implemented by a manner, as shown in FIG. 1 about a motion estimation apparatus 100. The integer part estimator 101 receives the data 111 of original frames and the data 112 of reference frames, and performs a wide search for the integer part. Then, the decimal part estimator 102 performs a small search for the decimal part on the motion vectors with best results. The searching method is calculating a cost function value for each of the motion vectors, and comparing the cost function values to select the best one of the motion vectors and its corresponding block mode 113.

In different video compression standards, the block size available for use may be different, and the filter coefficient used for interpolating the decimal reference frame may be different, either. The conventional method takes a specific video compression standard with the block size and a specific interpolation filter to implement the motion estimation. This may cause that the same motion estimation mode cannot effectively support the coding in multiple standards. For example, the block size for the standard of H.264/AVC (Advanced Video Coding) can change from 16×16 to 4×4. The interpolation filter is the 6-tap Wiener filter. However, the block for the MPEG-4 (Motion Picture Expert Group-4) can only support 16×16 or 8×8, and the interpolation filter is the 2-tap Bilinear filter or the 8-tap Wiener filter. The motion estimation modes for above two designs with specific standards cannot be compatible to each other.

Even though the U.S. Pat. No. 5,920,353 proposes a multi-standard coder, it is just related to the function block belonging to the decoding loop of the coder. So far, the conventional technology still cannot provide the high-quality compressing function under condition of supporting the multiple video compression standard.

SUMMARY OF THE INVENTION

The invention provides an apparatus for motion estimation, capable of supporting multiple video compression standards, and providing a high-quality compression under the condition of supporting multiple video compression standards.

The invention also provides a method for motion estimation, capable of supporting multiple video compression standards, and providing a high-quality compression under the condition of supporting multiple video compression standards.

For having the forgoing capabilities, the invention provides an apparatus for motion estimation, which is supporting multiple video compression standards. The apparatus includes an integer part estimator and a decimal part estimator. The integer part estimator calculates the cost function at the integer-point position on the multiple candidate sets of macroblock, and selects at least one of the candidate sets according to the cost functions. Each candidate set includes a block configuration of the macroblock and motion vectors respectively for all of the blocks in the macroblock. The block size of the block configuration is determined according to the external input of the block size mask. Then, the decimal part estimator uses the interpolation filter with fixed coefficients to recalculate the motion vectors and the cost functions at the decimal-point position from the candidate sets selected by the integer part estimator, and then selects one of the candidate sets according to the cost functions. The block size of the candidate set is also determined according to the external input of the block size mask.

For the forgoing apparatus for motion estimation with supporting multiple video compression standards, in an embodiment, the interpolation filter is a 2-tap bilinear filter.

For the forgoing apparatus for motion estimation with supporting multiple video compression standards, in an embodiment, each cost function is an addition of a sum of absolute difference (SAD) and a coding-need bit rate multiplied by a Lagrange multiplying number.

For the forgoing apparatus for motion estimation with supporting multiple video compression standards, in an embodiment, the value of the Lagrange multiplying number is adjusted according to the video compression standard being supported.

From another aspect, the invention also provides a method for motion estimation with supporting multiple video compression standards. The method can also be seen in the foregoing apparatus of motion estimation, and the descriptions are omitted here.

According to the embodiments of the invention, the apparatus and method for motion estimation of the invention use the interpolation filter with fixed coefficients, such as the 2-tap bilinear filter, which has good compression result and can be used in multiple standards. In addition, the invention can adjust the block size and the calculation algorithm of the cost function, according to the video compression standard. As a result, the invention can support the multiple standards and also improve capability of high-quality compression.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
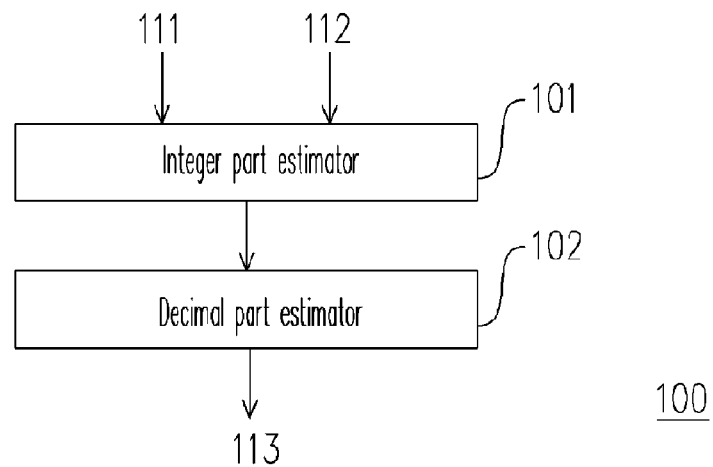
FIG. 1 is drawing, schematically illustrating a conventional apparatus of motion estimation.
Figure 2:
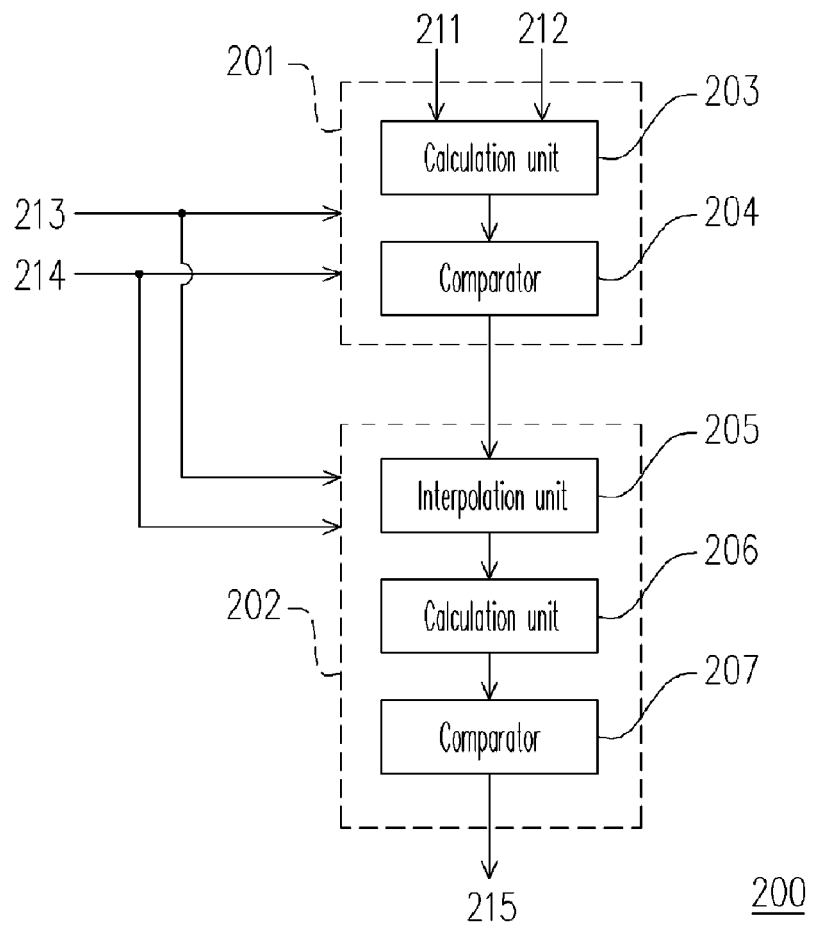
FIG. 2 is a drawing, schematically illustrating an apparatus of motion estimation, according to an embodiment of the invention.

FIG. 2 is a drawing, schematically illustrating an apparatus of motion estimation 200, according to an embodiment of the invention. In FIG. 2, the apparatus of motion estimation 200 includes an integer part estimator 201 and a decimal part estimator 202. The integer part estimator 201 includes a calculation unit 203 and a comparator 204, and the decimal part estimator 202 includes an interpolation unit 205, a calculation unit 206, and a comparator 207.

First, in the integer part estimator 201, the calculation unit 203 calculates the cost functions of several candidate sets in the macroblock at the integer-point position from multiple candidate sets of macroblock, according to the original frame data 211 and the reference frame data 212. Each candidate set includes a block configuration of the macroblock about how to divide the macroblock into smaller blocks, and motion vectors for every block in the block configuration.

All of the block sizes are determined according to the external input of the block size mask 213. In order to support multiple standards, the embodiment uses four block sizes of 16×16, 16×8, 8×16, and 8×8. Because not all of the video compression standards can support all of the block sizes, according to the block size mask 213, the apparatus of motion estimation 200 can mask the block size, which is not supported by the current video compression standard and is not used.

The current video compression standard does not have specific requirement about how to calculate the cost functions for the candidate sets, and the designer has the free option. In the embodiment, the cost function takes an addition of a sum of absolute difference (SAD) and a coding-need bit rate multiplied by a Lagrange multiplying number. The value of the Lagrange multiplying number is adjusted according to the video compression standard being supported. In the embodiment, the value of the Lagrange multiplying number is determined according to the external input signal 214. Of course, the invention can also be applied to a more complicate cost function, and the calculation detail can be different in accordance with different video compression standard, indicated by the input signal 214.

After the cost functions of the candidate sets are calculated out by the calculation unit 203, the comparator 204 compares the values of the cost functions. Then, according to the comparing result, at least one of the candidate sets is selected. In the embodiment, the cost function represents the value of information loss after compression. In this manner, the comparator 204 selects the candidate set with smaller cost function.

The candidate set, selected by the comparator 204, then enters the decimal part estimator 202. Likewise, the block size used by the decimal part estimator 202 is determined, according to the block size mask 213. The Lagrange multiplying number in the cost function is also determined, according to the input signal 214.

In the decimal part estimator 202, first, the interpolation unit 205 uses the interpolation filter with fixed coefficients to produce a reference frame data at the decimal-point position. The interpolation filter used in the invention is 2-tap bilinear filter. Since this kind of filter can support multiple standards, it is easy in use, and the compression quality is good. The calculation unit 206 uses the reference frame data provided from the interpolation unit 205, and then recalculates the motion vectors and the cost functions at the decimal-point position from the candidate sets selected by the integer part estimator 201. Then, the comparator 207 compares the values of the cost functions and selects one of the selected candidate sets, according to the comparing result. In the embodiment, it is the one with the smallest cost function. The selected candidate set is the output 215.

The apparatus of motion estimation 200 of the embodiment can support multiple compression standards, at least including H.264, MPEG-1, MPEG-2, MPEG-4, and SMPTE (Society of Motion Picture and Television Engineer) VC-1. The compression quality is also quite good. For example, according to the experimental results, in comparing the embodiment with the H.264/AVC, the file size for the compressed files is just about 3% difference.

In addition to the foregoing apparatus of motion estimation in embodiment, the invention also provides a method for motion estimation with supporting for multiple compression standards. Actually, the method has been implemented in the apparatus of motion estimation 200 as shown in FIG. 2, and is not further described.

In summary, the apparatus and method for motion estimation use the interpolation filter with fixed coefficients, such as the 2-tap bilinear filter with high-quality compression and suitable for use in multiple standards. In addition, the invention can adjust the block size and the calculation algorithm of the cost function, according to different video compression standard. As a result, the invention can support multiple standards and provide high-quality compression.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An apparatus for motion estimation, with supporting multiple video compression standards, comprising:
   an integer part estimator, at integer-point positions, calculating cost functions of candidate sets for a macroblock, wherein at least one of the candidate sets is selected according to the cost functions, each of the candidates sets includes a block configuration and a plurality of motion vectors respectively corresponding to blocks in the block configuration, a block size of the block configuration is determined according to a block size mask; and
   a decimal part estimator, using an interpolation filter with fixed coefficients, at a decimal-point position, recalculating the at least one motion vector and the at least one cost function of the selected at least one candidate set, one of the at least one candidate set being selected according to the at least one cost function, and a block size of the at least one candidate set is determined according to the block size mask.

2. The apparatus for motion estimation of claim 1, wherein the integer part estimator comprises:
   a first calculation unit, calculating the cost functions of the candidate sets; and
   a first comparator, comparing values of the cost functions, and selecting at least one of the candidate sets according to a comparing result.

3. The apparatus for motion estimation of claim 1, wherein the decimal part estimator comprises:
   an interpolation unit, using an interpolation filter to produce a reference frame data at decimal-point positions;
   a second calculating unit, using the reference frame data at the decimal-point position to recalculate the at least one motion vector and the at least one cost function of the selected at least one candidate set; and
   a second comparator, comparing a value of the at least one cost function and selecting one of the at least one candidate set according to a comparing result.

4. The apparatus for motion estimation of claim 1, wherein the interpolation filter is a fixed coefficient filter.

5. The apparatus for motion estimation of claim 1, wherein the block size for the candidate set includes one of 16×16, 16×8, 8×16, and 8×8.

6. The apparatus for motion estimation of claim 5, wherein if a portion of the blocks is not supported by the block size provided by the apparatus for motion estimation, then the apparatus for motion estimation masks the portion without use according to the block size mask.

7. The apparatus for motion estimation of claim 1, wherein the cost functions is based on a sum of absolute difference (SAD).

8. The apparatus for motion estimation of claim 7, wherein each of the cost function is an addition of the SAD and a coding-need bit rate multiplied by a Lagrange multiplying number.

9. The apparatus for motion estimation of claim 8, wherein the Lagrange multiplying number is adjusted according to the video compression standard supported by the apparatus for motion estimation.

10. A method for motion estimation, with supporting multiple video compression standards, comprising:
   (a) calculating cost functions of candidate sets in a macroblock at integer-point positions, wherein at least one of the candidate sets is selected according to the cost functions, each of the candidates sets includes a block configuration and a plurality of motion vectors respectively corresponding to blocks in the block configuration, a block size of the block configuration is determined according to a block size mask; and
   (b) using an interpolation filter with fixed coefficients, at decimal-point positions, recalculating the at least one motion vector and the at least one cost function of the at least one candidate set selected in step (a), one of the at least one candidate set being selected according to the at least one cost function, and a block size of the at least one candidate set is determined according to the block size mask.

11. The method for motion estimation of claim 10, the step (a) comprising: calculating the cost functions of the candidate sets; and
   comparing values of the cost functions, and selecting at least one of the candidate sets according to a comparing result.

12. The method for motion estimation of claim 10, the step (b) comprising: using an interpolation filter to produce a reference frame data at decimal-point positions; using the reference frame data at the decimal-point positions to recalculate the at least one motion vector and the at least one cost function of the at least one candidate set selected in step (a); and
   comparing a value of the at least one cost function and selecting one of the at least one candidate set according to a comparing result.

13. The method for motion estimation of claim 10, wherein the block size for the candidate set includes one of 16×16, 16×8, 8×16, and 8×8.

14. The method for motion estimation of claim 13, wherein if a portion of the blocks is not supported by the block size provided by the apparatus for motion estimation, then the apparatus for motion estimation masks the portion without use according to the block size mask.

15. The method for motion estimation of claim 10, wherein the cost functions is based on a sum of absolute difference (SAD).

16. The method for motion estimation of claim 15, wherein each of the cost function is an addition of the SAD and a coding-need bit rate multiplied by a Lagrange multiplying number.

17. The method for motion estimation of claim 16, wherein the Lagrange multiplying number is adjusted according to the video compression standard supported by the method for motion estimation.

* * * * *